UNITED STATES PATENT OFFICE.

EDMUND M. FLAHERTY, OF PARLIN, NEW JERSEY, ASSIGNOR TO E. I. DU PONT DE NEMOURS AND COMPANY, OF WILMINGTON, DELAWARE, A CORPORATION OF DELAWARE.

PYROXYLIN SOLVENT AND COMPOSITION CONTAINING THE SAME.

1,321,611.  Specification of Letters Patent.  Patented Nov. 11, 1919.

No Drawing. Application filed March 16, 1918, Serial No. 222,893. Renewed June 24, 1919. Serial No. 306,436.

*To all whom it may concern:*

Be it known that I, EDMUND M. FLAHERTY, of Parlin, in the county of Middlesex, and in the State of New Jersey, have invented a certain new and useful Improvement in Pyroxylin Solvent and Compositions Containing the Same, and do hereby declare that the following is a full, clear, and exact description thereof.

The object of my invention is to provide a solvent for pyroxylin bodies having the qualities of being cheap, having high solvent power, being free from precipitation of pyroxylin, non-hygroscopic, adapted to form a very fluid but cohesive solution, of pleasant odor, and having the property of depositing a film of nitrocellulose which is strong, transparent, and free from bubbles.

A further object is to use a solvent composition containing constituents which have approximately the same vapor tension, as it is desirable to have a number of the constituents evaporate more or less simultaneously.

A further object is to provide a solvent composition which, by reason of the presence of the particular alcohol therein, can be regulated as to its fluidity by varying the quantity of the alcohol as compared with the quantity of solid constituents therein.

In the pyroxylin industries, such as in the manufacture of lacquers, photographic film, artificial leather, varnishes, etc., there is a demand for a solvent having the above-stated qualities. None of the ordinary pyroxylin solvents, such as glacial acetic acid, amyl acetate and acetone, including their homologues and derivatives, has all of these properties in the highest degree, except, perhaps, amyl acetate and refined fusel oil, the cost of which is so excessive as to prevent a wide use of these latter solvents in the pyroxylin industries. In these several industries, it is desirable to vary the relative proportions of the solvent and pyroxylin to obtain a solution of the strength desired, according to the nature of the pyroxylin film to be formed. For example, in lacquer work the solution ordinarily does not contain over five ounces of pyroxylin per gallon in order that a film of proper thickness may be deposited. In some of the decorative arts a very heavy film is employed, which can be deposited from a solution containing as high as twenty ounces of pyroxylin per gallon. There is, thus, for each industry a strength of solution which is best adapted thereto. Where a solution is desired having less pyroxylin than the total amount which the solvent is capable of taking up (for instance, if a solution of twenty ounces of pyroxylin to a gallon of solvent were desired, which is less than the total amount which the solvent would take up), it is unnecessary to have the entire quantity of solution composed of pure solvent, it only being necessary to have enough solvent present to dissolve the desired amount of pyroxylin. For economy, therefore, it is customary to add cheap diluents to the solvent, which diluents are either, entirely non-solvent or nearly so. The use of diluents, however, introduces difficulties, among which may be mentioned the following: When, as used in a factory, these solvents are evaporated at the ordinary room atmosphere in order to deposit a film of pyroxylin, there is a tendency, except in the case of those solvents which are non-hygroscopic but expensive, such as amyl acetate and refined fusel oil, toward a separation out of the nitrocellulose or other solvents through absorption of moisture from the air or through the change in the composition of the solvent mixture resulting from the unequal rate of evaporation of its components, this precipitation being usually evidenced by the appearance of a whitish substance, technically known as "blushing" or "blooming", or by the settling to the bottom of a jellylike mass. Such separation tends to decrease the strength of the film and, in some cases, the white appearance produces objectionable color effects.

Butyl alcohol has the property of preventing precipitation of the pyroxylin during evaporation and in this respect is an excellent substitute for the refined fusel oil commonly used, the price of which at the present time is so high as to limit its use to a very few branches of the pyroxylin industry.

I find that during evaporation under ordinary factory conditions the pyroxylin solvent, butyl alcohol and benzol mixture makes a film which is strong and transparent.

Butyl alcohol is not itself a nitrocellulose solvent, but a mixture of a nitrocellulose solvent, such as ethyl acetate for example, with not more than 20 parts by weight of butyl alcohol has solvent powers greater than ethyl acetate alone.

For example, a composition made in accordance with my invention may comprise a solvent mixture made up of 5 to 50% by weight of butyl alcohol and 50 to 95% by weight of ethyl acetate or acetone or some other nitrocellulose solvent.

In order to provide a nitrocellulose composition utilizing the above solvent mixture, I may dissolve from 1 to 40 ounces of nitrocellulose in a gallon of the aforesaid solvent mixture.

Again, if it is desired to provide a nitrocellulose coating composition to be used as a lacquer, I may make the same with the following proportions:—

Butyl alcohol _____ 15% by weight
Ethyl acetate _____ 50% by weight
Benzene _____ 35% by weight
Nitrocellulose, 8 ounces per gallon of above solvent mixture.

But the relative percentages of these ingredients may vary widely according to the conditions covering the innumerable uses to which this solution may be put. I have given specific instances merely by way of illustration, and am not to be confined to the particular proportions given, as they are to be regarded as typical only.

An increase in the benzene component results in reduced cost, and its disadvantage lies in the less rapid solvent action which such mixture possesses.

The fluidity can be varied by varying the quantity of butyl alcohol.

Numerous other substances, such as oils, pigments, gums, resins, liquids, etc., may be added to the pyroxylin mixture, each having its own properties, and these properties will, of course, affect the properties of the final mixture, but the general principle will still obtain.

I find that my mixture is comparatively non-hygroscopic, which is a very desirable quality, since the absorption of water in such a solution results in a precipitation of the pyroxylin.

The properties of butyl alcohol are in general very advantageous in compositions of this character, as it has a slow evaporation, tends to inhibit blushing, produces smooth mixtures and smooth coatings, prevents the formation of air bubbles in the coatings, is relatively cheap.

In the manufacture of nitrocellulose base for photographic film the following mixture may be given as typical:

Nitrocellulose _____ 20
Methyl alcohol _____ 50
Amyl or butyl acetate _____ 12
Camphor _____ 13
Butyl alcohol _____ 25

All the above quantities are parts by weight. When employed as above butyl alcohol causes the solution to set quickly and the film to strip easily from the temporary support upon which it is originally cast.

While I have described my invention above in detail, I wish it to be understood that many changes may be made therein without departing from the spirit of the invention.

I claim:

1. A solvent mixture comprising ethyl acetate and butyl alcohol.

2. A solvent mixture comprising ethyl acetate, butyl alcohol and a diluent.

3. A solvent mixture comprising ethyl acetate, butyl alcohol and benzene.

4. A composition comprising nitrocellulose and a pyroxylin solvent mixture comprising ethyl acetate and butyl alcohol.

5. A composition comprising nitrocellulose and a pyroxylin solvent mixture comprising ethyl acetate, butyl alcohol and a diluent.

6. A composition comprising nitrocellulose and a pyroxylin solvent mixture comprising ethyl acetate, butyl alcohol and benzene.

In testimony that I claim the foregoing I have hereunto set my hand.

EDMUND M. FLAHERTY.

Witnesses:
C. W. TEN BROUCK,
H. E. KING.